US006301073B1

(12) United States Patent
Gillis et al.

(10) Patent No.: US 6,301,073 B1
(45) Date of Patent: Oct. 9, 2001

(54) DEVICE FOR PREVENTING MECHANICAL SHOCK-INDUCED DAMAGE BETWEEN ACTUATOR AND DISK IN COMPUTER HARD DISK DRIVE

(75) Inventors: Donald Gillis, San Jose; Mike Suk, Concord, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/442,931

(22) Filed: Nov. 18, 1999

(51) Int. Cl.$^7$ ....................................................... G11B 5/54
(52) U.S. Cl. ..................................... 360/97.01; 360/254.8
(58) Field of Search ........................... 360/254.3, 254.4, 360/254.5, 254.6, 254.7, 254.8, 254.9, 255, 255.6, 255.7, 254.2, 255.1, 255.2, 255.3, 255.4, 255.5, 255.8, 255.9, 97.01

(56) References Cited

U.S. PATENT DOCUMENTS

| 5,060,099 | 10/1991 | Yaeger et al. . | |
|---|---|---|---|
| 5,068,841 | 11/1991 | Nakayama et al. . | |
| 5,508,857 | 4/1996 | Horita . | |
| 5,550,695 | 8/1996 | Matsumoto . | |
| 5,668,682 | 9/1997 | Matsumoto . | |
| 5,742,455 | 4/1998 | Boutaghou . | |
| 5,828,522 | 10/1998 | Brown et al. . | |
| 6,021,019 | * 1/2000 | Genheimer et al. | 360/97.01 |
| 6,028,745 | * 2/2000 | Nguyen et al. | 360/254.3 |
| 6,055,134 | * 4/2000 | Boutaghou | 360/254.4 |
| 6,067,209 | * 5/2000 | Aoyagi et al. | 360/254.7 |
| 6,201,666 | * 3/2001 | Resh | 360/255.9 |
| 6,205,002 | * 3/2001 | Baumgart et al. | 360/135 |
| 6,212,029 | * 4/2001 | Fioravanti | 360/97.01 |
| 6,226,144 | * 5/2001 | Nagl et al. | 360/97.01 |
| 6,226,155 | * 5/2001 | Watanabe et al. | 360/254.8 |

FOREIGN PATENT DOCUMENTS

| 62-95778 | 5/1987 | (JP) . |
| 4-89675 | 3/1992 | (JP) . |
| 5-266621 | 10/1993 | (JP) . |
| 6-12802 | 1/1994 | (JP) . |

OTHER PUBLICATIONS

M. Hashimoto, H. Kajitani and N. Tagawa; Development of a New Sub–Sub Micron Flying Ramp–Loading Head with Emphasis on Slider Roll Control Capability; IEE Transactions on Magnetics, vol. 28, No. 5, Sep., 1992, pp. 2536–2538; Manuscript received Feb. 17, 1992.

* cited by examiner

Primary Examiner—David L. Ometz
Assistant Examiner—Franklin D. Altman, III
(74) Attorney, Agent, or Firm—Robert B. Martin; Bracewell & Patterson, L.L.P.

(57) ABSTRACT

A hard disk drive for a computer has a base containing a stack of rotatable disks and an actuator with a set of arms that is pivotable relative to the disks. At least one magnetic head is mounted to each arm for reading information from or writing information to a respective disk. The drive also has a stationary shock support member or comb located adjacent to the outer edges of the disks and the actuator. The teeth of the comb are interposed with the disks and arms throughout the range of pivotal motion of the arms. The teeth prevent incidental contact between the disks and arms in the event of mechanical shock to the hard disk drive.

14 Claims, 3 Drawing Sheets

DEVICE FOR PREVENTING MECHANICAL SHOCK-INDUCED DAMAGE BETWEEN ACTUATOR AND DISK IN COMPUTER HARD DISK DRIVE

BACKGROUND OF THE INVENTION

1. Technical Field

This invention relates in general to computer hard disk drives and in particular to an apparatus and method for reducing and/or preventing mechanical shock-induced damage between an actuator arm and a disk file in a computer hard disk drive.

2. Description of the Related Art

Generally, a digital data storage system consists of one or more storage devices that store data on storage media such as magnetic or optical data storage disks. In magnetic disk storage systems, a storage device is called a hard disk drive (HDD), which includes one or more disks and an HDD controller to manage local operations concerning the disks. Hard disks are platters, typically made of aluminum alloy, plastic substrates, or a mixture of glass and ceramic, covered with a magnetic coating. Typically, two or three platters are stacked vertically on a common spindle that is turned by a disk drive motor at several thousand revolutions per minute (rpm).

The only other moving part within a typical HDD is the head assembly. Within most drives, one read/write head is associated with each side of each platter and flies just above or in contact with the platter's surface. Each read/write head is connected to a semi-rigid arm apparatus which supports the entire head flying unit. More than one of such arms may be utilized together to form a single armature unit.

Each read/write head scans the hard disk platter surface during a "read" or "write" operation. The head/arm assembly is moved utilizing an actuator which is often a voice coil motor (VCM). The stator of a VCM is mounted to a base plate or casting on which is mounted a spindle supporting the disks. The base casting is in turn mounted to a frame via a compliant suspension. When current is fed to the motor, the VCM develops force or torque which is substantially proportional to the applied current. The arm acceleration is therefore substantially proportional to the magnitude of the current. As the read/write head nears the desired track, a reverse polarity signal is applied to the actuator, causing the signal to act as a brake, and ideally causing the read/write head to stop directly over the desired track.

If a hard disk drive sustains severe vibration or mechanical shock during operation, the arms of the actuator can contact the disks and may damage them. Although some hard disk drives have restraint mechanisms for withstanding high G-force impacts, they are typically limited to a single non-operational application. For example, a common prior art solution employs a stationary ramp located adjacent to the radial outer edge of the disk pack. When the heads on the arms of the actuator are rotated beyond the outer edges of the disks, the heads or arms are parked on the ramp and are unable to contact the disks. Unfortunately, this design is capable of protecting the drive only when the heads are radially outside of the disks.

In U.S. Pat. No. 5,668,682, a detachable disk drive having a head lift mechanism is disclosed. The mechanism moves the actuator arm and, thus, the head away from the disk when the drive is removed from a slot in a laptop computer. When the drive is inserted into the slot in the laptop computer, the actuator arm is automatically released so that the head may contact the disk for normal read/write operations. Unfortunately, the mechanism is limited to preventing contact between the actuator arm and the disk when the drive is removed from the laptop computer. Thus, if the laptop undergoes shock when the drive is installed, the actuator arm will not be prevented from striking the disk, regardless of the operational status of the drive of the radial position of the actuator arm. Therefore, an improved disk drive for preventing shock-induced contact between the actuator arm and disk is needed.

SUMMARY OF THE INVENTION

A hard disk drive for a computer has a base containing a stack of rotatable disks and an actuator with a set of arms that is pivotable relative to the disks. At least one magnetic head is mounted to each arm for reading information from or writing information to a respective disk. The drive also has a stationary shock support member or comb located adjacent to the outer edges of the disks and the actuator. The teeth of the comb are interposed with the disks and arms throughout the range of pivotal motion of the arms. The teeth prevent incidental contact between the disks and arms in the event of mechanical shock to the hard disk drive.

BEST MODE FOR CARRYING OUT THE INVENTION

Figure 1:
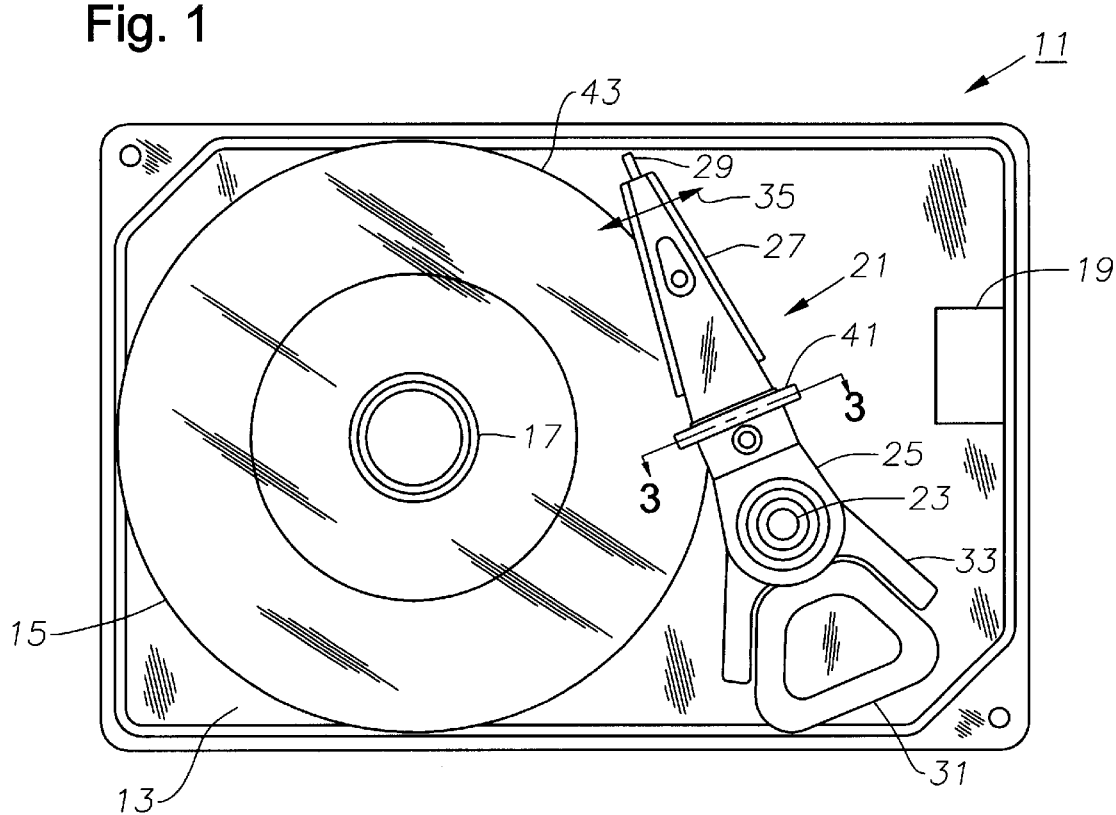
FIG. 1 is a top schematic view of a hard disk drive having a shock support member constructed in accordance with the invention, and shown with the actuator in a first position.

Referring to FIG. 1, a schematic drawing of a first embodiment of an information storage system comprising a magnetic hard disk drive 11 for a computerized device is shown. Drive 11 has an outer housing or base 13 containing a plurality of stacked, parallel magnetic disks 15 (one shown) which are closely spaced apart. Disks 15 are rotated by a motor located therebelow about a central drive hub 17. A plurality of stacked, parallel actuator arms 21 (one shown) are pivotally mounted to base 13 about a pivot assembly 23. A controller 19 is mounted to the base for selectively moving arms 21 relative to disks 15.

In the embodiment shown, each arm 21 comprises a mounting support 25, a pair of parallel, cantilevered load beams or suspensions 27 extending from each mounting support 25, and a head gimbal assembly 29 having at least one magnetic read/write head secured to each suspension 27 for magnetically reading data from or magnetically writing data to disks 15. Suspensions 27 have a spring-like quality which biases or maintains them in parallel relationship relative to one another. A motor assembly 31 having a conventional voice coil motor is also mounted to pivot assembly 23 opposite head gimbal assemblies 29. Movement of an actuator driver 33 (indicated by arrow 35) moves head gimbal assemblies 29 radially across tracks on the disks 15 until the heads on assemblies 29 settle on the target tracks. The head gimbal assemblies 29 operate in a conventional manner and always move in unison with one another, unless drive 11 uses a split actuator (not shown) wherein the arms move independently of one another.

Figure 3:
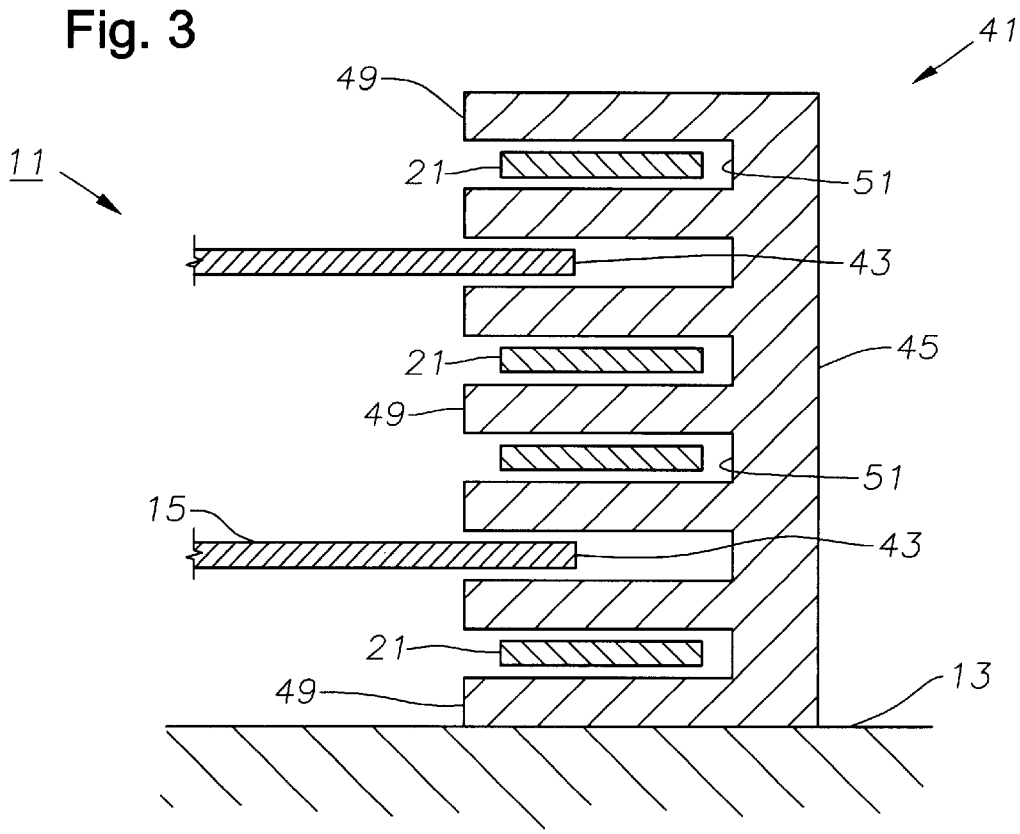
FIG. 3 is an enlarged sectional side view of the shock support member of FIG. 1 taken along the line 3—3 of FIG. 1.

Referring now to FIGS. 1 and 3, drive 11 also has a shock support member 41 that is stationarily mounted to base 13. The main body 45 of shock support member 41 extends in a substantially orthogonal direction from base 13 (FIG. 3). Shock support member 41 is located adjacent to and slightly overlaps the outer edges 43 of disks 15. In the top view of FIG. 1, shock support member 41 has a radial dimension that is wider than a radial dimension of arms 21 such that shock support member 41 completely overlaps arms 21 as shown. As will be explained below, shock support member 41 may have a longer or shorter radial dimension, depending on the radial width or dimension of actuator arms 21 where said elements interface.

Similarly, shock support member 41 is not limited to the longitudinal position illustrated, but may be located at almost any longitudinal position along arms 21. For example, shock support member 41 may be located closer to or further away from head gimbal assemblies 29. If shock support member 41 is located closer to head gimbal assemblies 29 adjacent to suspensions 27, it will have a longer radial dimension (relative to disks 15) than that shown in order to cover the larger sweep of arms 21. If shock support member 41 is located closer to pivot assembly 23 adjacent to mounting support 25, a shorter radial dimension than that shown will suffice since arms 21 move in a smaller radial sweep at that location. In the preferred embodiment, shock support member 41 is located adjacent to the interface between mounting supports 25 and suspensions 27.

As shown in FIG. 3, shock support member 41 has a comb-like structure with a plurality of thin cantilevered fingers 49 that extend perpendicularly from body 45. Shock support member 41 and its fingers 49 are formed from a smooth, stiff material such as resinous plastics or stainless steel. Fingers 49 have a thin, rounded or aerodynamic profile to reduce dynamic air drag. Each pair of adjacent fingers 49 defines a substantially rectangular slot 51 therebetween. Fingers 49 and slots 51 may be formed in other shapes as well, such as a saw-tooth shape profile. Fingers 49 and slots 51 are substantially parallel to disks 15 and arms 21, and have radial dimensions that are wider than the radial dimension of arms 21. Under normal operating conditions, each slot 51 closely receives but does not contact one arm 21 or mounting support 25, or the surfaces and outer edge 43 of one disk 15. Thus, disks 15 and arms 21 are free to rotate and pivot, respectively, relative to shock support member 41.

In operation, disks 15 are rotated by the motor at a high speed about central drive hub 17. Arms 21 move in the directions indicated by arrows 35 and position the heads on head gimbal assemblies 29 relative to the various tracks on disks 15 (FIG. 2) so that the heads may read from or write to the tracks. The tracks on disks 15 define a radial operational range within which the heads interact with disks 15. Disks 15 must be rotating and head gimbal assemblies 29 must be located in the operational range in order for information to be processed in disk drive 11. Under such conditions, drive 11 is said to be in operation or "operational." Thus, drive 11 is not in operation or is "nonoperational" when: (a) disks 15 are not rotating, (b) the heads on head gimbal assemblies 29 are located radially inside or radially outside of the operational range, or (c) both (a) and (b).

In FIGS. 1 and 3, actuator arms 21 are shown pivoted to their approximately outermost position relative to disks 15.

Figure 2:
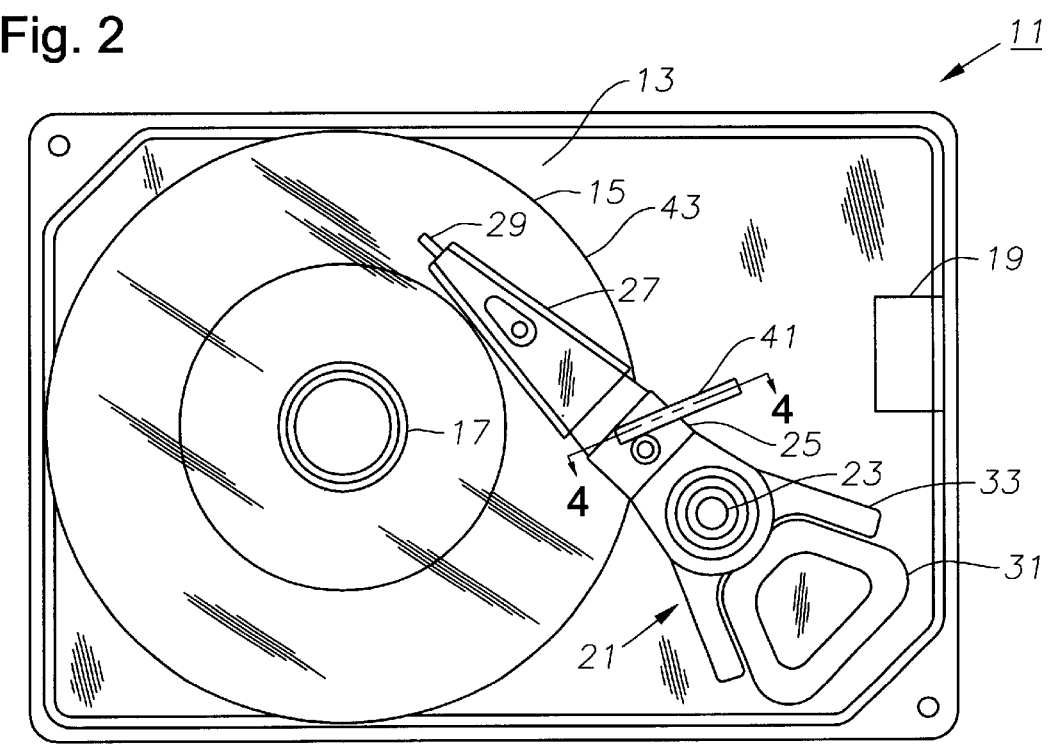
FIG. 2 is a top schematic view of the hard disk drive of FIG. 1 with the actuator in a second position.
Figure 4:
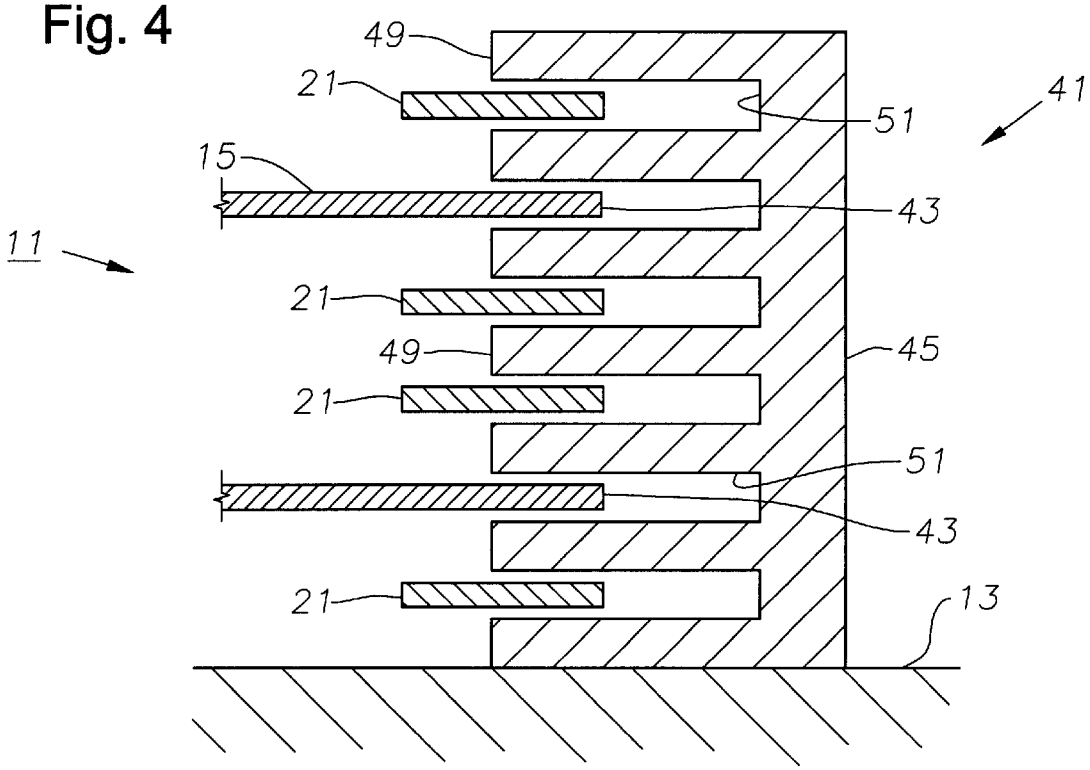
FIG. 4 is an enlarged sectional side view of the shock support member of FIG. 2 taken along the line 4—4 of FIG. 2.

In FIGS. 2 and 4, actuator arms 21 are shown pivoted to their approximately innermost position relative to disks 15. Actuator arms 21 also may be located anywhere in between these two extremes. These drawings schematically illustrate the range of travel of actuator arms 21. Since shock support member 41 extends radially inward relative to disks 15, actuator arms 21 are never radially separated from fingers 49 or slots 51. Thus, no matter what pivotal position actuator arms 21 are in, fingers 49 will always be located between disks 15 and at least a portion of arms 21. This consistent overlap configuration enables fingers 49 to prevent contact between arms 21 and disks 15 at all times and under all conditions.

When drive 11 experiences an abnormal mechanical shock event such as when the computer it is installed in is jolted or dropped, disks 15 and arms 21 will tend to move violently or rapidly oscillate toward each other. If disks 15 and arms 21 were to collide under such conditions, they could be readily and permanently damaged. However, with the presence of shock support member 41, the smooth, stiff, low-friction fingers 49 located between adjacent ones of disks 15 and arms 21 prevent their contact. The only portion of arms 21 permitted to touch disks 15 during a shock event or otherwise are the heads on the head gimbal assemblies 29, which routinely contact disks 15 under normal operating conditions.

Figure 5:
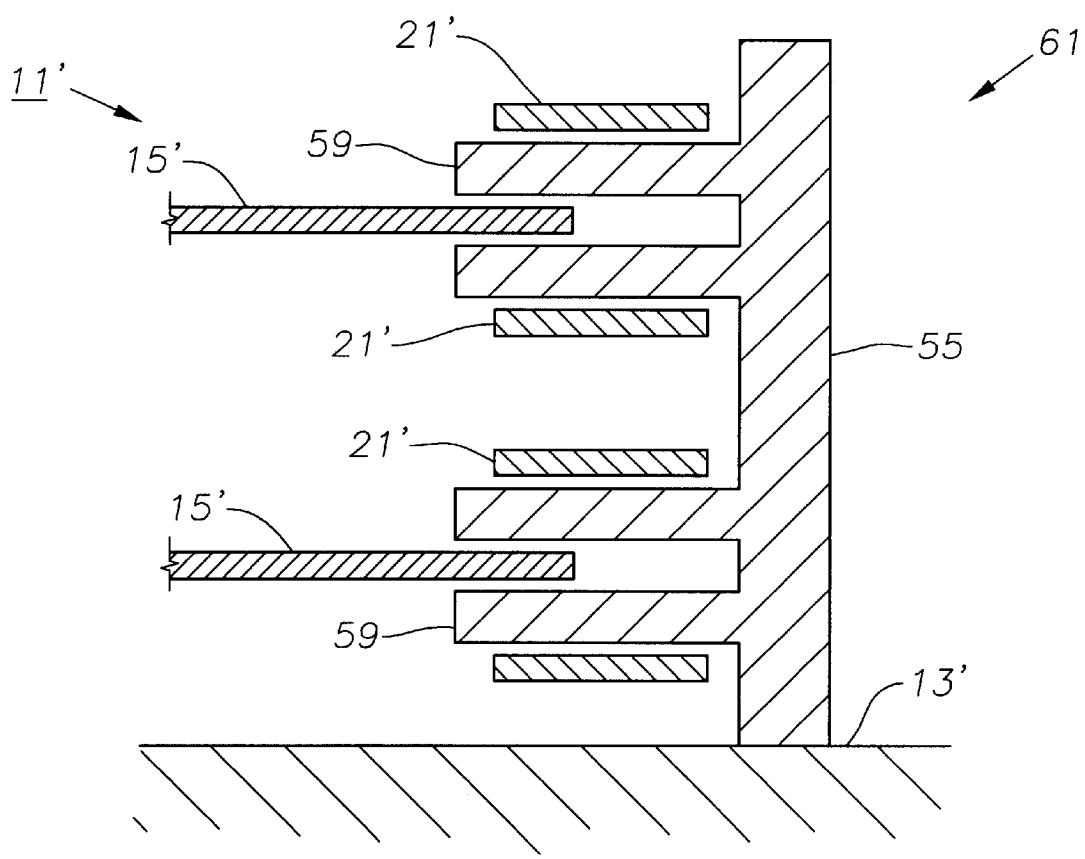
FIG. 5 is an enlarged sectional side view of a second embodiment of the shock support member of FIG. 1.

Shock support member 41 is ideally suited for preventing contact between the named components of drive 11 when it is nonoperational. Although shock support member 41 is capable of preventing such contact when drive 11 is operational, there may be collateral or residual damage to drive 11 that is inherent with mechanical shock events. Referring now to FIG. 5, a second embodiment of the invention is depicted as shock support member 61. This version is merely one of many other possible combinations to prevent contact between the sensitive components of a disk drive during a mechanical shock event. Although this embodiment is almost identical to shock support member 41, it is more appropriately suited for disk drives wherein the disks and actuator arms are fewer in number, or located further apart from one another.

Like member 41, shock support member 61 has a main body 55 that mounts to the base 13' of a hard disk drive 11'. In this version, the fingers 59 of shock support member 61 are located only between the actuator arms 21' and disks 15'. There are no fingers 59 located between adjacent ones of the actuator arms 21'. Under normal operating conditions, fingers 59 are free of contact with all other components of drive 11'. It is only in the event of mechanical shock that disks 15' and/or arms 21' will touch fingers 59. Thus, like the previous embodiment, shock support member 61 prevents the components of drive 11' from damaging one another during a shock event, regardless of the radial position of arms 21'.

The invention has several advantages. The fingers of the shock support members are interposed in a comb-like fashion between the disks and actuator arms of the drive at all times in order to prevent their incidental contact with each other during mechanical shock events such as when a laptop computer is accidentally bumped or dropped. The smooth but resilient fingers prevent the arms from damaging the disks or vice-versa no matter where the arms are located at the time of the shock event.

While the invention has been shown or described in only some of its forms, it should be apparent to those skilled in the art that it is not so limited, but is susceptible to various changes without departing from the scope of the invention.

For example, although the present invention is described for use in a magnetic disk storage system, the invention is also applicable to other information storage systems as well.

What is claimed is:

1. A hard disk drive, comprising:

a base;

a disk mounted to the base and selectively rotatable relative thereto;

an actuator having an arm with a head for reading data from or writing data to a surface of the disk, the actuator being pivotally mounted to the base for positioning the arm and the head at selected radial positions relative to the disk; and a shock support member stationarily mounted to the base adjacent to the disk and the arm of the actuator, the shock support member having a finger located between the disk and the arm in all of the radial positions of the arm relative to the disk, such that the finger is interposed between the disk and the arm throughout an entire pivotal range of motion of the arm, wherein the shock support member and the finger are free of contact with the disk and the arm under normal operating conditions; and wherein the shock support member is adapted to prevent contact between the arm of the actuator and the disk when the hard disk drive experiences a mechanical shock event.

2. The hard disk drive of claim 1 wherein the shock support member is located adjacent to an outer radial edge of the disk and the finger extends generally radially inward relative to the disk.

3. The hard disk drive of claim 1 wherein the finger on the shock support member is cantilevered.

4. The hard disk drive of claim 1 wherein the finger of the shock support member is substantially perpendicular to the disk and to the arm.

5. The hard disk drive of claim 1 wherein the arm of the actuator comprises a mounting support and a suspension extending from the mounting support, and wherein the finger of the shock support member is located adjacent to an interface between the mounting support and the suspension.

6. The hard disk drive of claim 1 wherein the finger of the shock support member has a radial dimension that is wider than a radial dimension of the arm.

7. The hard disk drive of claim 1 wherein the finger of the shock support member has aerodynamic profile to reduce dynamic air drag.

8. A hard disk drive, comprising:

a base;

a plurality of disks mounted to the base and selectively rotatable relative thereto, each of the disks having opposed surfaces and a radial outer edge;

an actuator having a plurality of arms, each of the arms having at least one head for reading data from or writing data to surfaces of respective ones of the disks, the actuator being pivotally mounted to the base for positioning the arms and the heads at selected radial positions relative to the disks;

a shock support member stationarily mounted to the base adjacent to the arms of the actuator and the radial outer edges of the disks, the shock support member having a plurality of substantially parallel, cantilevered fingers extending generally radially inward relative to the disks, the fingers being interposed between the disks and the arms regardless of the radial position of the arms relative to the disks, wherein the shock support member and the fingers are free of contact with the disks and the arms under normal operating conditions; wherein the shock support member is adapted to prevent contact between the arms of the actuator and the disks when the hard disk drive experiences a mechanical shock event; and wherein at least some of the fingers of the shock support member are located between adjacent ones of the arms of the actuator to prevent contact between said adjacent ones of the arms when the hard disk drive experiences mechanical shock events.

9. A hard disk drive, comprising:

a base;

a plurality of disks mounted to the base and selectively rotatable relative thereto, each of the disks having opposed surfaces and a radial outer edge;

an actuator having a plurality of arms, each of the arms having at least one head for reading data from or writing data to surfaces of respective ones of the disks, the actuator being pivotally mounted to the base for positioning the arms and the heads at selected radial positions relative to the disks; and a shock support member stationarily mounted to the base adjacent to the arms of the actuator and the radial outer edges of the disks, the shock support member having a plurality of substantially parallel, cantilevered fingers extending generally radially inward relative to the disks, the fingers being interposed between the disks and the arms regardless of the radial position of the arms relative to the disks, such that the fingers are interposed between the disks and the arms throughout an entire pivotal range of motion of the arms, wherein the shock support member and the fingers are free of contact with the disks and the arms under normal operating conditions; and wherein the shock support member is adapted to prevent contact between the arms of the actuator and the disks when the hard disk drive experiences a mechanical shock event.

10. The hard disk drive of claim 9 wherein each of the arms of the actuator comprises a mounting support and a suspension extending from the mounting support, and wherein the fingers of the shock support member are located adjacent to interfaces between the mounting supports and the suspensions.

11. The hard disk drive of claim 9 wherein each of the fingers of the shock support member has a radial dimension that is wider than a radial dimension of the arms.

12. The hard disk drive of claim 9 wherein each of the fingers of the shock support member has an aerodynamic profile to reduce dynamic air drag.

13. A method for preventing damage in a hard disk drive during a mechanical shock event, the hard disk drive having a base, an actuator pivotally mounted to the base and having a plurality of arms, a plurality of disks rotatably mounted to the base, and at least one head mounted to each of the arms of the actuator for reading data from or writing data to respective ones of the disks, the method comprising:

(a) providing a shock support member stationarily mounted to the base, the shock support member having a plurality of fingers extending therefrom between the disks and the armns of the actuator, the fingers being free of contact with the disks and the arms;

(b) selectively pivoting the actuator relative to the disks and the shock support member such that the arms remain free of contact with the shock support member;

(c) subjecting the hard disk drive to a mechanical shock event such that the arms move violently toward the disks but are prevented from contacting the disks due to the presence of the fingers of the shock support member.

14. The method of claim 13 wherein step (c) further comprises preventing contact between adjacent ones of the arms of the actuator when the hard disk drive experiences mechanical shock events.

* * * * *